(12) United States Patent
Zhang et al.

(10) Patent No.: US 9,325,273 B2
(45) Date of Patent: Apr. 26, 2016

(54) METHOD AND SYSTEM FOR DRIVING ELECTRIC MACHINES

(71) Applicant: General Electric Company, Schenectady, NY (US)

(72) Inventors: Di Zhang, Niskayuna, NY (US); Luis José Garcés, Niskayuna, NY (US); Andrew Allen Rockhill, Mechanicville, NY (US); Rixin Lai, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 290 days.

(21) Appl. No.: 14/040,767

(22) Filed: Sep. 30, 2013

(65) Prior Publication Data

US 2015/0091488 A1    Apr. 2, 2015

(51) Int. Cl.
*H02P 23/00*    (2006.01)
*H02M 7/537*   (2006.01)
(Continued)

(52) U.S. Cl.
CPC ............. *H02P 27/06* (2013.01); *H02M 7/217* (2013.01); *H02M 7/487* (2013.01); *H02P 27/14* (2013.01); *H02P 27/16* (2013.01); *H02M 2007/4835* (2013.01); *H02P 1/16* (2013.01)

(58) Field of Classification Search
CPC ........... H02P 27/06; H02P 27/14; H02P 1/16; H02M 7/487
USPC .............................. 318/519; 363/131; 320/120
See application file for complete search history.

(56) References Cited

U.S. PATENT DOCUMENTS

| 5,532,575 A | 7/1996 | Ainsworth et al. |
|---|---|---|
| 6,091,610 A | 7/2000 | Garcia et al. |

(Continued)

FOREIGN PATENT DOCUMENTS

| DE | 10103031 A1 | 7/2002 |
|---|---|---|
| EP | 2290799 A1 | 3/2011 |

(Continued)

OTHER PUBLICATIONS

A. Leisnicar et al.; An Innovative Modular Multilevel Converter Topology Suitable for a Wide Power Range, IEEE Bologna Power Tech Conference, Jun. 23-26, 2003, Bologna, Italy, 6 Pages.
(Continued)

*Primary Examiner* — Eduardo Colon Santana
*Assistant Examiner* — Gabriel Agared
(74) *Attorney, Agent, or Firm* — Ann M. Agosti

(57) ABSTRACT

A system for driving an electric machine is provided. The system includes a power converter coupled to an input source and the electric machine. The power converter includes a leg that includes a first and second string. The first string includes plurality of controllable semiconductor switches, a first and second connecting node. The first string is operatively coupled across a first and second bus. The second string is operatively coupled to the first string via the first and second connecting node. The second string comprises plurality of switching modules. The switching modules include fully controllable semiconductor switches and energy storage devices. The system further includes a system controller configured to provide activation commands to the controllable semiconductor switches and the switching modules such that energy stored in the energy storage device is provided to the electric machine when the machine is switched on for operation.

9 Claims, 6 Drawing Sheets

(51) Int. Cl.
| | |
|---|---|
| *H02J 7/00* | (2006.01) |
| *H02P 27/06* | (2006.01) |
| *H02M 7/487* | (2007.01) |
| *H02M 7/217* | (2006.01) |
| *H02P 27/14* | (2006.01) |
| *H02P 27/16* | (2006.01) |
| *H02P 1/16* | (2006.01) |
| *H02M 7/483* | (2007.01) |

(56) References Cited

U.S. PATENT DOCUMENTS

| | | |
|---|---|---|
| 6,466,458 B2 | 10/2002 | Zhang et al. |
| 6,578,674 B2 | 6/2003 | Doran et al. |
| 6,778,413 B2 | 8/2004 | Kates |
| 7,835,166 B2 | 11/2010 | Hiller |
| 7,960,871 B2 | 6/2011 | Dommaschk et al. |
| 7,969,755 B2 | 6/2011 | Davies et al. |
| 8,008,805 B2 | 8/2011 | Mizukoshi et al. |
| 8,045,346 B2 | 10/2011 | Abolhassani et al. |
| 8,144,489 B2 | 3/2012 | Dommaschk et al. |
| 8,233,300 B2 | 7/2012 | Dommaschk et al. |
| 8,254,076 B2 | 8/2012 | Ledezma et al. |
| 8,294,306 B2 | 10/2012 | Kumar et al. |
| 8,385,097 B2 | 2/2013 | Asplund |
| 8,390,259 B2 | 3/2013 | Dommaschk et al. |
| 8,395,280 B2 | 3/2013 | Graovac et al. |
| 8,400,796 B2 | 3/2013 | Doefnaes et al. |
| 2005/0139259 A1 | 6/2005 | Steigerwald et al. |
| 2006/0044857 A1 | 3/2006 | Lemak |
| 2006/0233000 A1 | 10/2006 | Akagi |
| 2008/0175028 A1 | 7/2008 | Stefanutti et al. |
| 2008/0198637 A1 | 8/2008 | Meysenc et al. |
| 2009/0244936 A1 | 10/2009 | Falk et al. |
| 2009/0295225 A1 | 12/2009 | Asplund et al. |
| 2011/0019449 A1 | 1/2011 | Katoh et al. |
| 2011/0019453 A1 | 1/2011 | Gonzalez Senosiain et al. |
| 2011/0096575 A1 | 4/2011 | Asplund et al. |
| 2011/0115532 A1 | 5/2011 | Roesner et al. |
| 2011/0254473 A1 | 10/2011 | Pasuri et al. |
| 2012/0228947 A1* | 9/2012 | Noy .................. H01L 31/02021 307/80 |
| 2013/0016549 A1* | 1/2013 | Kieferndorf .......... H02M 7/487 363/131 |
| 2013/0134924 A1* | 5/2013 | Kanakasabai ........... B60L 1/003 320/104 |

FOREIGN PATENT DOCUMENTS

| | | |
|---|---|---|
| EP | 1927183 B1 | 6/2011 |
| WO | 9614686 A1 | 5/1996 |
| WO | 2011124260 A1 | 10/2011 |
| WO | 2011127980 A1 | 10/2011 |
| WO | 2012016592 A1 | 2/2012 |
| WO | 2013135277 B2 | 9/2013 |
| WO | 2013137749 A1 | 9/2013 |

OTHER PUBLICATIONS

Silke Allebrod et al., New Transformerless, Scalable Modular Multilevel Converters for HVDC-Transmission, IEEE, 2008, 6 Pages.

Xiaoqian et al., "Capacitor Voltage Balancing Control Based on CPS-PWM of Modular Multilevel Converter", Energy Conversion Congress and Exposition (ECCE), 2011 IEEE, Issue Date: Sep. 17-22, 2011, Print ISBN: 978-1-4577-0542-7, pp. 4029-4034.

Barker et al., "Reactive power loading of components within a modular multi-level HVDC VSC converter",Electrical Power and Energy Conference (EPEC), 2011 IEEE , Issue Date: Oct. 3-5, 2011, Print ISBN: 978-1-4577-0405-5, pp. 86-90.

Noman Ahmed et al.; HVDC SuperGrids with Modular Multilevel Converters—the Power Transmission Backbone of the Future, IEEE 9th International Multi-Conference on Systems, Signals and Devices, 2012, 7 Pages.

Zhang et al.,"Multilevel Converter System", Pending U.S. Appl. No. 13/629,882, filed Sep. 28, 2012, 36 Pages.

Adam et al., "New flying capacitor multilevel converter", Industrial Electronics (ISIE), 2011 IEEE International Symposium, pp. 335-339, Jun. 27, 2011.

European Search Report and Written Opinion issued in connection with corresponding EP Application No. 14185925.6 on Aug. 5, 2015.

\* cited by examiner

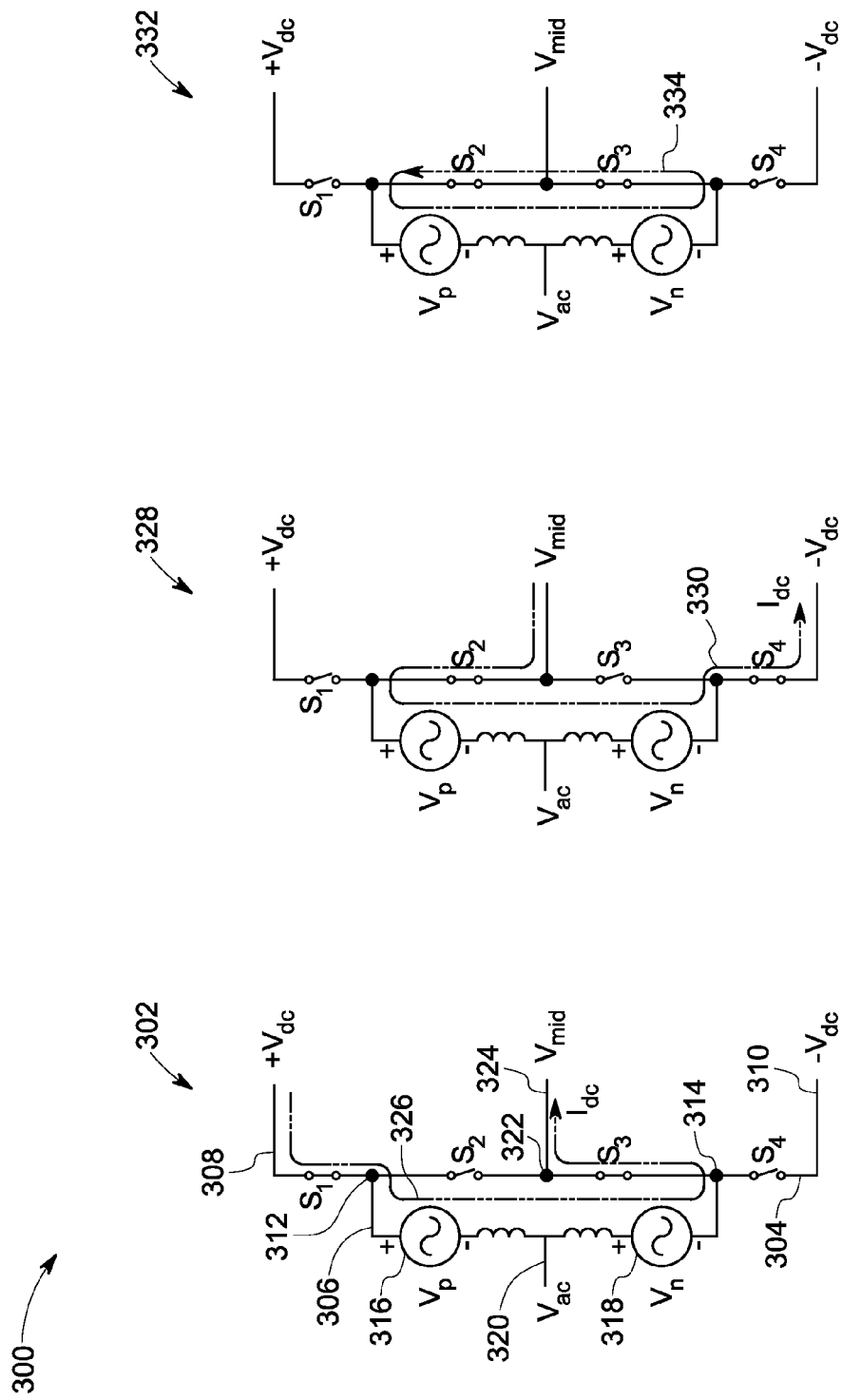

METHOD AND SYSTEM FOR DRIVING ELECTRIC MACHINES

BACKGROUND

The invention relates generally to power converters and more specifically to a system for driving electric machines connected to power converters.

The utility and importance of power conversion has grown with advantages being achieved in applications such as motor drives, renewable energy systems, and high voltage direct current (HVDC) systems, for example. The multilevel converter is emerging as a promising power conversion technology for various medium and high voltage applications.

Multilevel converters offer several advantages over conventional two-level converters. For example, the power quality and efficiency of the multilevel converter is better than that of the two level converter. Also, multilevel converters are ideal for interfacing between a grid and renewable energy sources such as photovoltaic (PV) cells, fuel cells, and wind turbines. Transformer-less multilevel converters have been designed using a modular structure. Such multilevel converters typically include a plurality of power modules that are coupled between DC buses. The modular structure of the converters allows stacking of these converters to provide different power and voltage levels.

Multilevel power converters typically include a plurality of semiconductor switches and energy storage devices that are placed between the input and output terminals. The semiconductor switches and energy storage devices in the converter aid in providing regulated output power at the output terminals. The output power at the output terminals is dependent on the activation of the semiconductor switches and energy present in the energy storage devices.

Some electric motors are coupled to output terminals of a power converter that is supplied with AC power and used to provide DC voltage. In conventional modular power converters, the energy stored in energy storage devices is dependent on the voltage and current on the AC side of the converter. This dependence leads to an increase in energy storage requirements.

BRIEF DESCRIPTION

A topology for a modular multilevel power converter is described in commonly assigned U.S. application Ser. No. 13/629,882, which is herein incorporated by reference. The inventors have discovered that using the modular power converter described in the aforementioned application, referred to as modular embedded multi-voltage Converter (MEMC), can provide energy to the motor connected on output terminals which can run at very low speeds or even under zero speed conditions. In addition, with MEMC, the harmonic current and rate of change of voltage supplied to the output terminal can be reduced significantly as compared with classic two or three level converters. A method and system that configures the MEMC for utilization in motor related applications are described herein In one embodiment of the present invention, a system for driving an electric machine is provided. The system includes a power converter coupled to an input source and the electric machine. The power converter includes a power converter leg that includes a first string and a second string. The first string includes a plurality of controllable semiconductor switches, a first connecting node, and a second connecting node. The first string is operatively coupled across a first bus and a second bus. The second string is operatively coupled to the first string via the first connecting node and the second connecting node. The second string comprises a plurality of switching modules. The switching modules include a plurality of fully controllable semiconductor switches and at least one energy storage device. The system further includes a system controller configured to provide activation commands to at least some of the controllable semiconductor switches from the first string, and at least some of the switching modules from the second string such that energy stored in the energy storage device is provided to the electric machine when the electric machine is switched on for operation.

In another embodiment of the present invention, a method for driving an electric machine is provided. The method includes providing power from an input source to the electric machine through a power converter. The power converter includes at least one leg that includes a first string and a second string. The first string includes a plurality of controllable semiconductor switches, a first connecting node, and a second connecting node. The first string is operatively coupled across a first bus and a second bus. The second string is operatively coupled to the first string via the first connecting node and the second connecting node, and includes a plurality of switching modules. The switching modules include a plurality of fully controllable semiconductor switches and at least one energy storage device. The method further includes generating a plurality of activation commands for the semiconductor switches and switching modules. Furthermore, when the electric machine is switched on for operation, the method includes activating the plurality of semiconductor switches and switching modules such that energy stored in the switching modules is provided to the electric machine.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

FIGS. 3-5 are a diagrammatical representation of an exemplary switching pattern of controllable semiconductor switches in the power converter leg of FIG. 2, according to aspects of the present disclosure;

DETAILED DESCRIPTION

Figure 1:
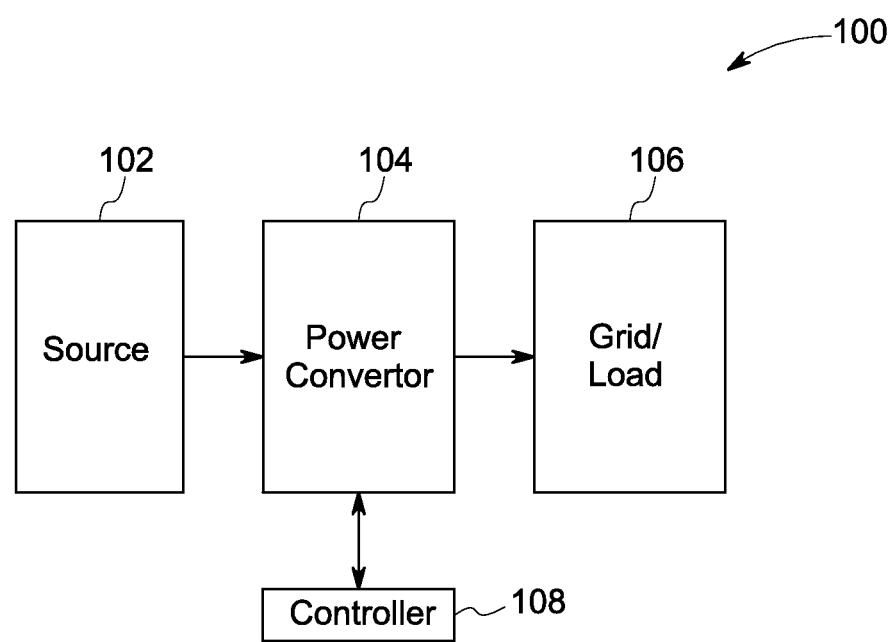
FIG. 1 is a diagrammatical representation of a system for power conversion.

Reference will be made below in detail to exemplary embodiments of the invention, examples of which are illustrated in the accompanying drawings. Wherever possible, the same reference numerals used throughout the drawings refer to the same or like parts.

As will be described in detail hereinafter, various embodiments of an exemplary method and system for driving an electric machine are provided. The term multilevel power converter, as used herein, is used to refer to a converter that includes multiple levels of switches connected to different phases of one form of input voltage/current and that converts the input voltage/current to another form of output voltage/ current. The power converter is coupled to an input source at an input terminal and a load, such as an electric motor, at an output terminal. The power converter is configured to deliver optimum power from the input source to the electric motor such that the electric motor functions efficiently. The input source, according to certain embodiments, may include AC power sources such as gas, steam or wind turbines, for example, or DC power sources such as batteries, other energy storage devices, or solar power systems, for example. The power converter converts power from the input source to an appropriate form that is suitable to be utilized by the electric motor.

FIG. 1 depicts a system 100 including a source 102, a power converter 104, and a load 106. The term source, as used herein, may comprise a renewable power source, a non-renewable power source, a generator, or a grid, for example. In another possible configuration, the source may comprise another power converter. The term load, as used herein, may be used to refer to a grid, a machine, or an electrical appliance, for example. In one embodiment, the load 106 is an electric machine that requires power from the input source 102 for operations. The power converter 104 comprises a multilevel converter configured to convert power from one form to another. In an embodiment where the source 102 delivers AC power, and the load 106 requires DC power for operation, the power converter 104 is configured to convert the AC power from the source 102 to DC power, as required by the load 106. The power converter 104 may alternatively be configured to convert DC power to AC power. In some other embodiments, when the source 102 may be located at a remote location with respect to the load 106, it may be desirable to convert AC power delivered by the source 102 to DC power and transmit DC power through DC buses (that experience low losses) to the location of the load 106. At the location of the load 106, depending on the type of power required for operation of the load 106, the DC power from the DC buses may be converted to AC power by the power converter 104, or it may be converted to a desired power level with the help of the power converter 104.

Figure 2:
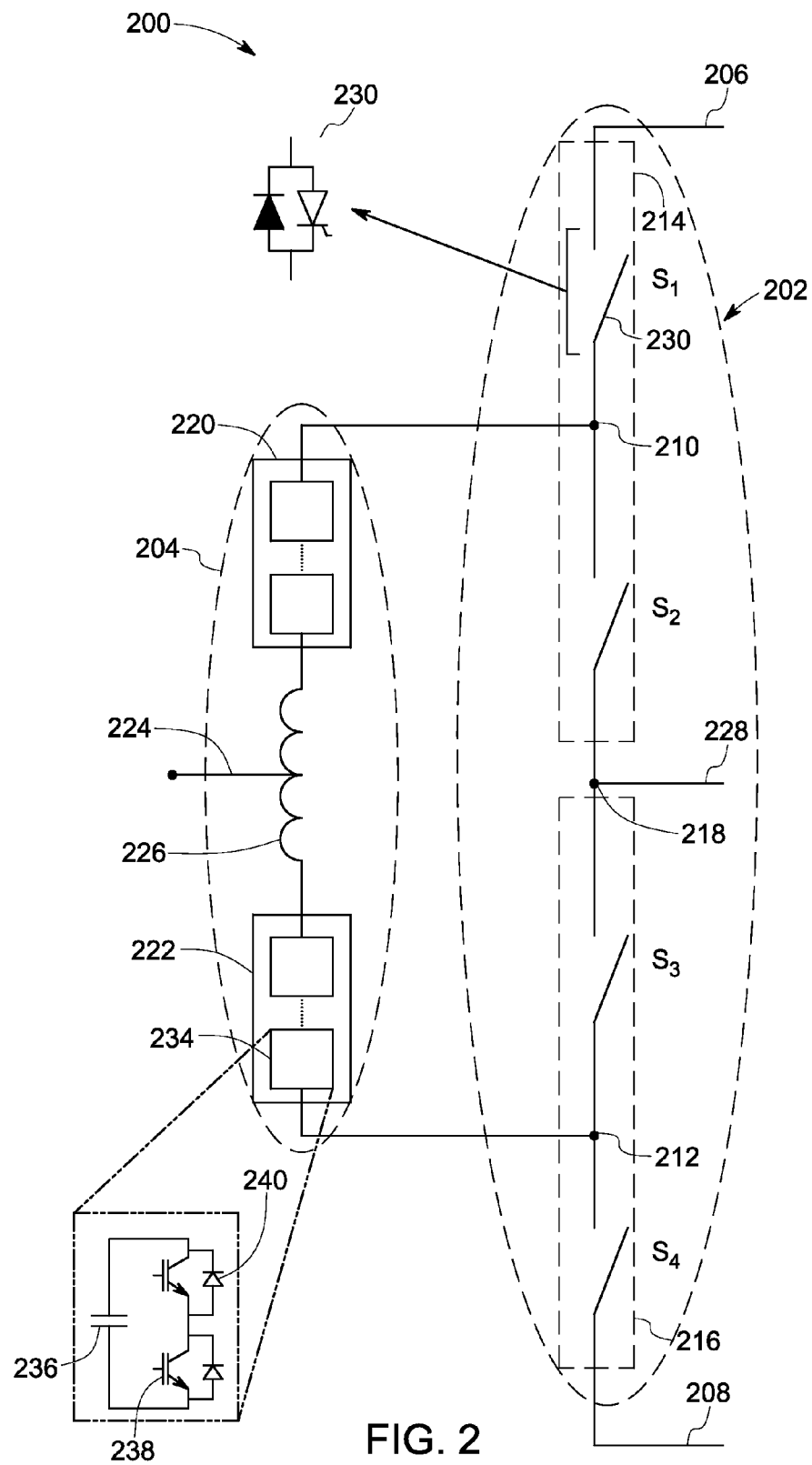
FIG. 2 is a diagrammatical representation of a leg of a power converter.

The power converter 104, according to certain embodiments, may include legs, such as the leg shown in FIG. 2, that are coupled between DC-link buses that are configured to transmit power from the input source to the load. The legs of the power converter 104 are configured such that regulated power is supplied from the input source to the load, and the operations of the power converter 104 are controlled by a controller 108.

By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a transformer, a circuit breaker, an inductor, a compensator, a capacitor, a rectifier, a reactor, and a filter.

In FIG. 2, a diagrammatical representation a leg 200 of a power converter is depicted. The leg 200 of the power converter includes a first string 202 and a second string 204. More particularly, the first string 202 is operatively coupled to the second string 204 to form the leg 200. Furthermore, the first string 202 may be operatively coupled between a first bus 206 and a second bus 208. In one embodiment, the first bus 206 may include a positive DC bus, and the second bus 208 may include a negative DC bus. The first string 202 may be operatively coupled to the second string 204 via a first connecting node 210 and a second connecting node 212. Also, the first string 202 may include a first branch 214 operatively coupled to a second branch 216 via a third connecting node 218. Similarly, the second string 204 may include a first arm 220 operatively coupled to a second arm 222 via an AC phase 224 and an inductor 226. The third connecting node 218 may be operatively coupled to a third bus 228. In the embodiment of FIG. 2, the third bus 228 may comprise a direct current bus and more particularly, a middle or center DC bus which may be at a negative potential with respect to the first bus 206 and at a positive potential with respect to the second bus 208.

The first string 202 may include a plurality of controllable semiconductor switches $S_1$, $S_2$, $S_3$, and $S_4$ (230). In the example of FIG. 2, the plurality of controllable semiconductor switches 230 may include partially controllable semiconductor switches. However, in another embodiment, the plurality of controllable semiconductor switches may alternatively include fully controllable semiconductor switches. Moreover, the plurality of controllable semiconductor switches may include a combination of partially controllable semiconductor switches and fully controllable semiconductor switches. Furthermore, in one example, the first branch 214 of the first string 202 may include two controllable semiconductor switches $S_1$ and $S_2$. Similarly, the second branch 216 of the first string 202 may include two controllable semiconductor switches $S_3$ and $S_4$. The controllable semiconductor switches $S_1$, $S_2$, $S_3$, and $S_4$ may include a power diode in combination with a thyristor, a silicon controlled rectifier, a gate turnoff thyristor, or an IGBT, for example.

The first arm 220 and the second arm 222 of the second string 204 may include a plurality of switching modules 234. The switching module 234 may be a combination of a plurality of fully controllable semiconductor switches 238 and at least one energy storage device 236. The fully controllable semiconductor switches 238 may include insulated gate bipolar transistors (IGBTs), metal oxide semiconductor field effect transistors (MOSFETs), other types of field effect transistors (FETs), gate turn-off thyristors, insulated gate commutated thyristors (IGCTs), injection enhanced gate transistors (IEGTs), or combinations thereof. The materials of such switches may comprise silicon, silicon carbide, gallium nitride, or gallium arsenide, for example. The switching modules 234 in the first arm 220 and the second arm 222 are selected such that the voltage rating of the leg 200 is met and a minimum voltage step requirement of the power converter is fulfilled.

Each of the fully controllable semiconductor switches 238 may also include a power diode 240 that may be inbuilt and antiparallel to the fully controllable semiconductor switches. The inbuilt power diodes 240 may provide a freewheeling path. These power diodes 240 may also be referred to as freewheeling diodes.

In one non-limiting example, the energy storage device 236 may include a capacitor, an ultra-capacitor, a super conducting coil, a battery or any other storage element. In the example of FIG. 2, the fully controllable semiconductor switch 238 may be operatively coupled in series to the energy storage device 236.

The leg 200 may be employed in a single phase power converter, a two phase power converter, a three phase power converter, and other equivalent multiphase DC to AC, AC to DC, AC to AC, or DC to DC power converters. The switching of the semiconductor switches in the first string 202 and the second string 204 may be controlled based on reference value for a controlled variable required at the output terminal. For example, the switches may be controlled to deliver required output power at the output terminals. In some embodiments, a power converter with the leg 200 may be coupled with another power converter with leg 200 to create a back-to-back power conversion configuration.

FIGS. 3-5, depict diagrammatical representations 300, 400, and 500 of different states of a leg of a power converter, such as the leg 200 of FIG. 2. Referring to FIG. 3, a diagrammatical representation of a leg 302, such as the leg 200 of FIG. 2, in a first state of switching of the controllable semiconductor switches is presented. The first state may also be referred to as a positive state. The leg 302 may include a first string 304 and a second string 306. Also, the leg 302 may be operatively coupled between a first bus 308 and a second bus 310. As noted hereinabove, the first bus 308 may include a positive DC bus and the second bus 310 may include a negative DC bus. Furthermore, the first string 304 may be operatively coupled to the second string 306 via a first connecting node 312 and a second connecting node 314.

In addition, a first arm, such as the first arm 220 of FIG. 2 of the second string 306, and a second arm, such as the second arm 222 of FIG. 2 of the second string 306, may be represented by controllable voltage sources $V_p$ 316 and $V_n$ 318, respectively. As noted hereinabove, the second string 306 may include a plurality of switching modules (not shown). The first arm of the second string 306 and the second arm of the second string 306 may be operatively coupled via the fourth bus 320. A load, such as the load 106, may be coupled to the leg 300 via the fourth bus 320. Also, the first string 304 may include a third connecting node 322, which may be operatively coupled to a third bus 324. In the configuration of FIG. 2 the first string 304 includes four controllable semiconductor switches represented as $S_1$, $S_2$, $S_3$ and $S_4$. Additionally, the voltage at the first bus 308 may be represented as $+V_{dc}$, and the voltage at the second bus 310 may be represented as $-V_{dc}$. By way of example, the voltage of $+V_{dc}$ at the first bus 308 and the voltage of $-V_{dc}$ at the second bus 310 may be with respect to a virtual ground. In the illustrated embodiment, the voltages across the first bus 308 and the second bus 310 are measured with respect to the third bus 324. The voltage at the third bus 324 may be represented as $V_{mid}$.

As depicted in FIG. 3, during the first state of switching, the controllable semiconductor switches $S_1$ and $S_3$ are activated to allow current to flow therethrough, while the controllable semiconductor switches $S_2$ and $S_4$ are maintained in a deactivated state to prevent current from flowing therethrough. The activation of controllable semiconductor switches $S_1$ and $S_3$ provides a first current flow path 326 between the first bus 308 and the third bus 324 via a corresponding second string 306. Consequently, the second string 306 may be operatively coupled between the first bus 308 and the third bus 324 in the positive state. Furthermore, while the first current flow path 326 is established, the voltage across the first bus 308 and the third bus 324 may depend on the switching of the fully controllable semiconductor switches corresponding to the plurality of switching modules in the second string 306, such as the switching modules 334 of FIG. 3. The current flowing through the first current flow path 326 is represented as $I_{dc}$.

In a similar fashion, FIG. 4 is a diagrammatical representation 328 of a leg in a second state of switching of the controllable semiconductor switches. The second state of switching of the controllable semiconductor switches may also be referred to as a negative state. In the second state, the controllable semiconductor switches $S_2$ and $S_4$ may be activated, while controllable semiconductor switches $S_1$ and $S_3$ are deactivated. The activation of the controllable semiconductor switches $S_2$ and $S_4$ results in providing a second current flow path 330 between the third bus 324 and the second bus 310. Accordingly, the second string 306 may be operatively coupled between the second bus 310 and the third bus 324 in the negative state.

Similarly, FIG. 5 is a diagrammatical representation 332 of a leg in a third state of switching of the controllable semiconductor switches. The third state of switching of the controllable semiconductor switches may also be referred to as a zero state. In the third state, the controllable semiconductor switches $S_2$ and $S_3$ are activated, while the controllable semiconductor switches $S_1$, and $S_4$ are deactivated. The activation of the controllable semiconductor switches $S_2$ and $S_3$ results in providing a third current flow path 334. This third current flow path 334 may also be referred to as a freewheeling path. In addition, both ends of the second string 306 may be operatively coupled to each other via the activated controllable semiconductor switches $S_2$ and $S_3$ and the third bus 324. Although, FIGS. 3-5 represent the three states of switching with reference to a single leg, these three states of switching may be employed simultaneously for a plurality of legs in a two phase power converter, a three-phase power converter, and the like.

As depicted in FIGS. 3-5 at any instant in time, the second string 306 is operatively coupled between the first bus 308 and third bus 324, between the third bus 324 and the second bus 310, or both ends of the second string 306 may be operatively coupled to a third bus 324. Hence, the second string 306 may have to withstand a maximum voltage of value $V_{dc}$. Accordingly, for effective control of the power converter, the first arm of the second string 306 and the second arm of the second string 306 may each have to withstand a maximum voltage of $V_{dc}$.

Furthermore, the switching of the plurality of controllable semiconductor switches $S_1$, $S_2$, $S_3$, and $S_4$ of the first string 304 may operate in combination with the switching of the plurality of switching modules (not shown) in the second string 306. Also, as previously noted, the switching of the plurality of switching modules in the second string 306 may include activation and/or deactivation of the fully controllable semiconductor switches. The switching modules in the second string 306 and the switches in the first string 304 are controlled by a controller 1108 (FIG. 11) such that regulated power is provided at the output terminal while ensuring that the energy stored in the power converter is maintained at a constant level.

In a three-phase power converter, three legs 200 are connected in parallel between the first bus 206 and the second bus 208. The legs 200 are connected such that the first string 202 of each leg is coupled with the first bus 206 on one end and the second bus 208 on another end. Furthermore, the first string 202 of each leg 200 is coupled to the third bus 228. The voltage of the first bus 206 and the second bus 208 is measured with respect to the third bus 228. The fourth bus 320 of each leg 200 is coupled with phases of the load 106. For example, in the case of electric machine drive application via a three-phase converter, each phase (leg 200) of the power converter is coupled to a respective one of the three phases of the electric machine.

In the foregoing description, a three-phase converter has been utilized to explain the operations of the power converter. It may be understood that the operations of the power converter remain the same for single-phase converters as well as multi-phase converter with two legs 200 or more than three legs 200.

Figure 9:
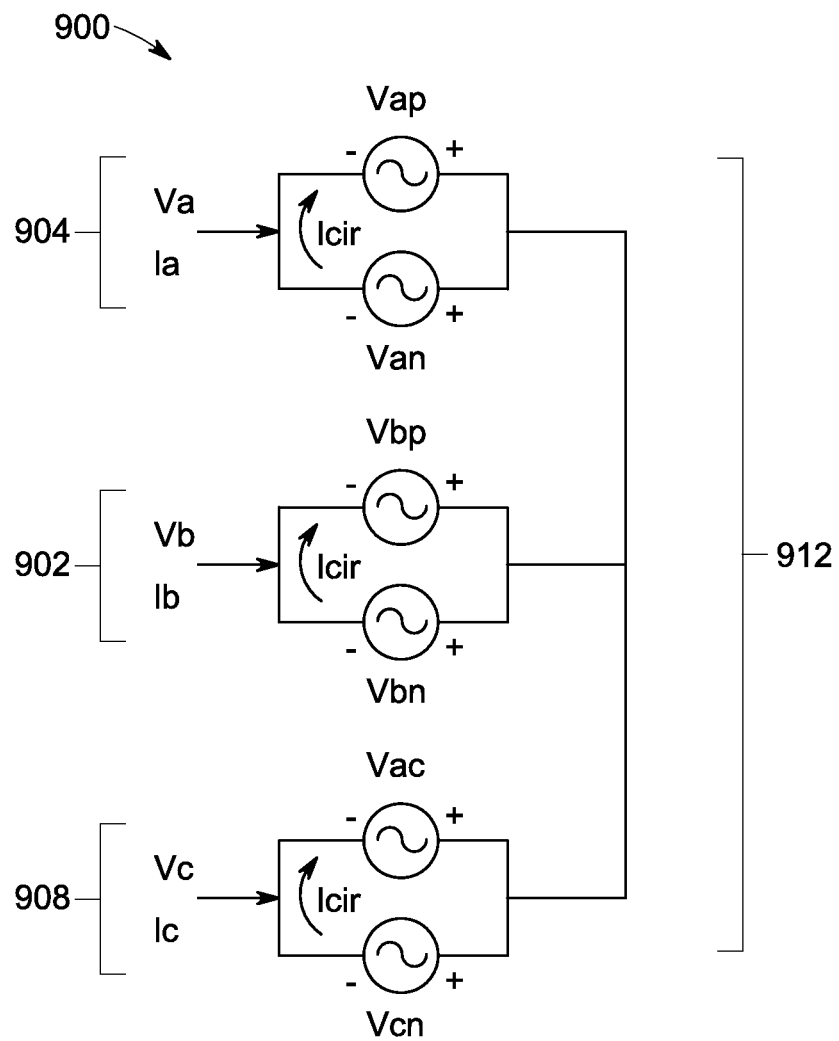

Referring to FIG. 6-9, a diagrammatical representation 600, 700, 800, and 900 of different modes of operation of a three phase power converter, according to the aspects of the present disclosure, are depicted. For ease of understanding, FIGS. 6-9 will be described with respect to FIGS. 3-5. Based on an input received by the three legs of the power converter, the power converter may be operating in one of the three modes depicted in FIG. 6-8. To provide power for a load such as the electric machine 110, the power converter may be operated in a state as depicted in FIG. 9, according to one embodiment. In the illustrations of FIG. 6-9, it is assumed that an AC input is provided to the power converter. More precisely each of the three phases of an AC input source are connected to a respective leg of the power converter. Depending on the input received from the AC input source, each leg of the power converter operates in at least on mode illustrated in FIGS. 6-9.

The modes of operation of the power converter are dependent on the switching pattern of the semiconductor switches and the switching modules. The switches and switching modules are controlled by a controller, for example the controller 1108 (FIG. 11), such that the power converter transitions from one mode to another in accordance with the input signal.

Modes of operation of the power converter are determined by the state of each leg of the power converter. As illustrated in FIG. 3-5, each leg of the power converter can be in either a positive state, a negative state, or a zero state. Steady modes of operation of the power converter include a mode where one or more legs are in the positive state and the other legs are in a negative state. A steady mode of operation also includes a mode where one leg is in a positive state, one leg is in a negative state, and one leg is in a zero state. In comparison, a transient mode involves at least one leg of the power converter being in a transient mode. FIGS. 6-9 illustrate steady as well as transient modes of operation of the power converter.

Figures 6, 7, 8:
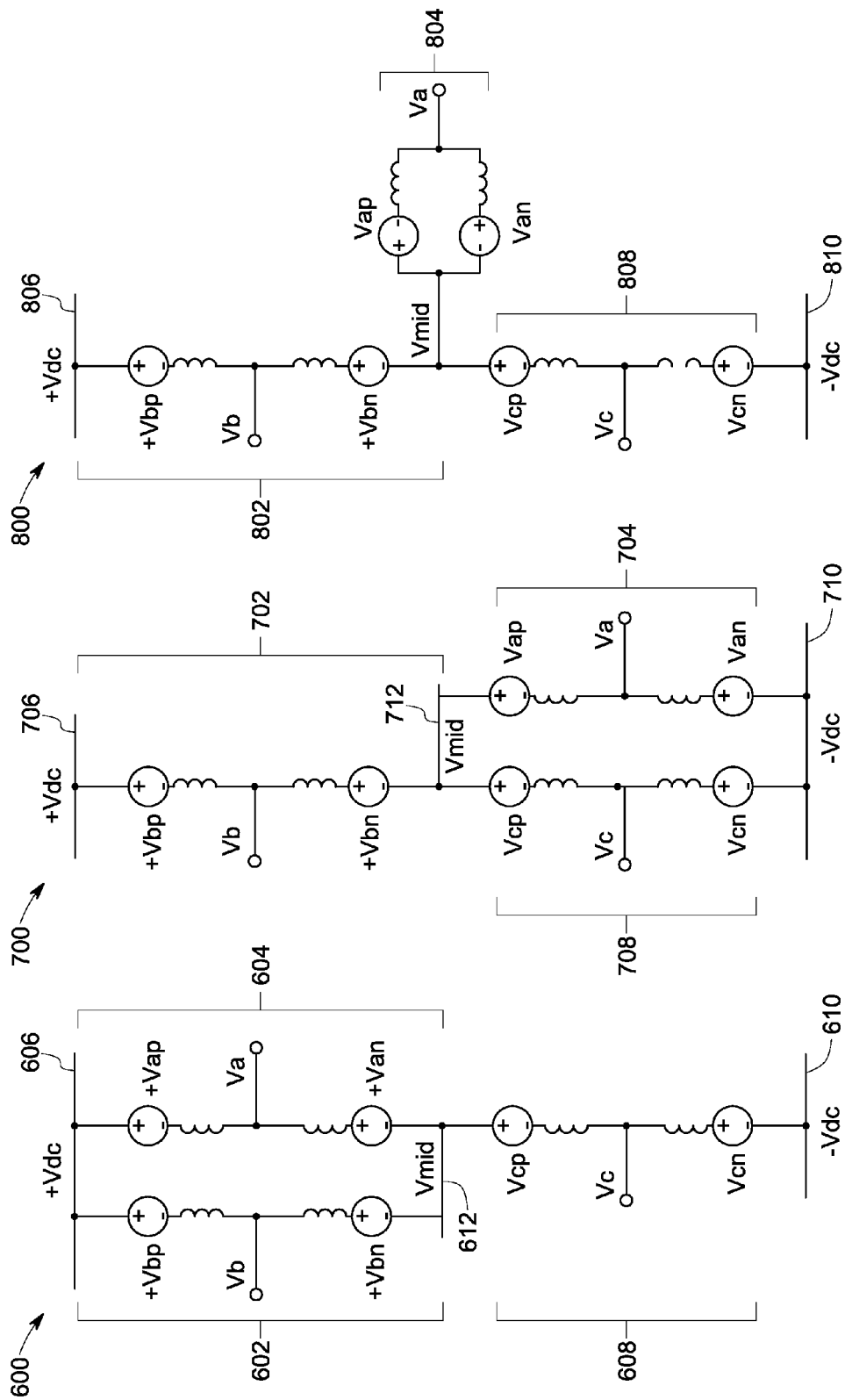
FIGS. 6-9 are a diagrammatical representation of exemplary modes of operation of the power converter leg of FIG. 2, according to aspects of the present disclosure.

FIG. 6 illustrates a mode of operation 600 of a converter when two legs are in a positive state and one leg of the converter is in negative state. The mode of operation 600 can be termed as mode "a". In mode a, for a three-phase power converter, the legs 602 and 604 are coupled to the positive bus 606 while the leg 608 is coupled to the negative bus 610. In mode "a", the semiconductor switches $S_1$ and $S_3$ of two legs 602 and 604 are switched on and semiconductor switches $S_3$ and $S_4$ are switched on for the remaining leg 608. The legs 602 and 604 are coupled such that one end is coupled to the positive bus 606 and the other end of the legs is coupled to a third bus 612. The leg 608 is coupled to the third bus 612 on one end and to the negative bus 610 on the other end.

FIG. 7 illustrates a second mode 700 of operation of the power converter with three legs 702, 704, and 708. In the second mode of operation 700, also termed as mode "b", two legs are coupled to a negative bus 710 and a third bus 712, and one leg is coupled to the positive bus 708. In the illustrated embodiment, the legs 704 and 708 are coupled to the third bus 712 and the negative bus 710 while the leg 702 is coupled to the positive bus 706 and the third bus 712.

FIG. 8 illustrates a third mode 800 of operation of the power converter with three legs 802, 804, and 808. In the third mode of operation 800, also termed as mode "c", one leg is coupled to the positive bus 806 and the third bus 812, one leg is coupled to the third bus 812 and the negative bus 810, and one leg is coupled on both ends to the third bus 812. In the illustrated example, the leg 802 is coupled to the positive bus 806 and the third bus 812. The leg 804 is coupled to the third bus 812 on both ends. Whereas, the leg 808 is coupled to the third bus 812 and the negative bus 810. Mode "c" may be considered a transient mode of operation for the power converter.

The modes of operation illustrated in FIGS. 6-7 are considered steady modes of operation of the power converter. In the steady modes of operation, the energy storage devices in the power converter are configured to receive and store energy from the input source. The energy stored in the energy storage devices of the legs of the power converter may be utilized to provide regulated power to the load coupled to the output terminal of the power converter. In the transient mode, as illustrated in FIG. 8, energy storage devices in the legs coupled to the positive bus 806 and the negative bus 810 continue to receive and store energy from the input source. However, the leg in zero state is temporarily de-coupled from the input source.

During a normal AC input operation, the modes of the power converter periodically change from mode "a" to "b" to "c" and back to "a". The transition of these modes is carried out with the help of semiconductor switches $S_1$, $S_2$, $S_3$, and $S_4$ of each leg. The four semiconductor switches of each leg are utilized to couple the switching modules to either the positive bus, the negative bus, or the third bus. For example, when the power converter transitions from mode "a" to mode "b" as illustrated in FIGS. 6 and 7 respectively, the leg 602 transitions from a positive state to a negative state (represented as 702 in FIG. 7). In the positive state, the switches $S_1$ and $S_3$ corresponding to the leg 602 are activated. Whereas, in the negative state, $S_2$, and $S_4$ are activated. During this transition, the switches $S_1$ and $S_3$ need to be deactivated and the switches $S_2$ and $S_4$ need to be activated. A controller, such as the controller 1108 (FIG. 11), may be configured to activate $S_2$, and $S_4$ to facilitate the entry of the power converter into mode "b".

Similarly, according to the illustrated embodiment, when the power converter transition from mode "b" to mode "c", the leg 702 transitions from a positive state to a zero state (represented as 802, in FIG. 8). During this transition, the switch S4 associated with leg 702 needs to be deactivated and a switch $S_2$ needs to be activated such that $S_2$ and $S_3$ for the leg 702 remain activated and move the leg 702 in a zero state. The transient mode of operation, or mode "c", is activated during the time frame when the power converter transitions from mode "a" to mode "b".

FIG. 9 illustrates a fourth mode 900 of operation of the power converter. The fourth mode 900 may also be termed as "d" mode of operation of the power converter. In the fourth mode of operation, the legs 902, 904, and 908 are coupled to third bus 912 on both ends. In this mode, the energy stored in energy storage devices of each leg 902, 904, and 908 is provided to the load connected to the output terminal of the power converter.

During operations of the power converter when an electric machine that is coupled to the output terminals is switched on for operation, the energy storage devices of the power converter are configured to store energy during modes "a", "b", and "c" of operation. In mode "d" the power converter is configured to provide power to the electric machine coupled at the output terminals. The power provided by the power converter is available through the energy stored in the energy storage devices of the legs of the power converter. The controller, such as the controller 1108 (FIG. 11), is configured to activate and deactivate appropriate semiconductor switches ($S_1$, $S_2$, $S_3$, $S_4$) from the first string of each leg 200 such that the power converter transitions from either mode "a", mode "b", or mode "c" to mode "d".

The controller 1108 (FIG. 11) may be configured to balance energy stored in the first arm 220 and the second arm 222 of each leg 200 in the power converter. The controller 1108 is configured to compute a difference between energy stored in the first arm 220 and the second arm 222 of each leg to generate a phase arm reference voltage. The phase arm reference voltage is utilized by the controller 1108 to drive a current in the leg 200 such that the energy stored in the first arm 220 and the second arm 222 is balanced.

The controller 1108 (FIG. 11) may also be configured to compare energy stored in the energy storage devices with a predetermined threshold value. The predetermined threshold value is an indicator of minimum energy required to be stored in the energy storage devices of the power converter. When the energy in the energy storage devices of the power converter is below the predetermined threshold value, the controller is configured to activate and deactivate switches $S_1$, $S_2$, $S_3$, $S_4$ from the first string of each leg 200 such that the power converter transitions from mode "d" to mode "a", or mode "b", or mode "c". The transition from mode "d" to other modes of operation is dependent on the input received at input terminals of the power converter.

Figure 10:
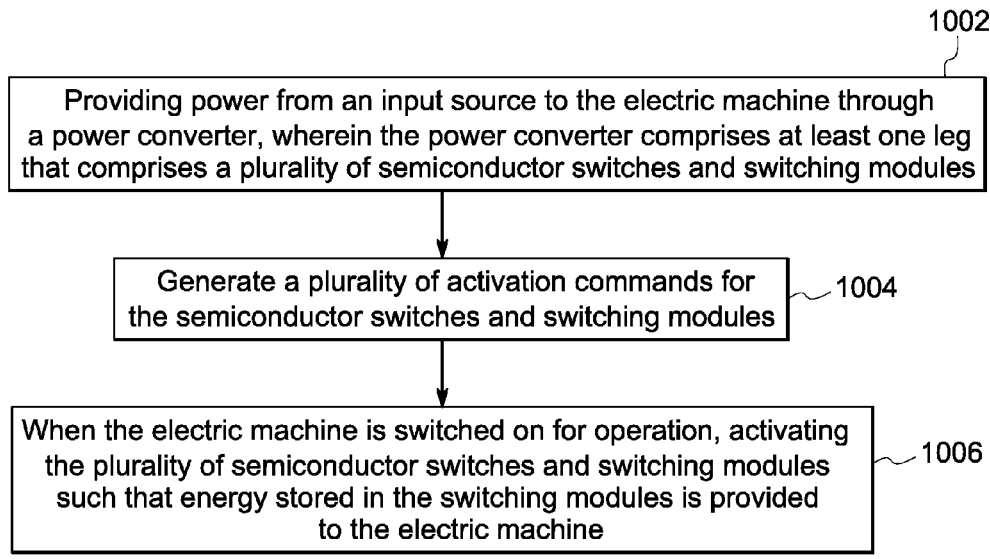
FIG. 10 is a flow chart representing an exemplary method of driving an electric machine, according to aspects of the present disclosure.

A method for driving an electric machine with a power converter, such as the power converter 104 with a leg 200, is described in conjunction with the flow diagram of FIG. 10.

At 1002, the method includes providing power from an input source to the electric machine through a power converter. The power converter, for example the power converter 104, includes a leg 200 with a first string 202 and a second string 204. The first string 202 includes a plurality of semiconductor switches ($S_1$, $S_2$, $S_3$, and $S_4$) and the second string 204 includes a plurality of switching modules 234. The switching modules 234 are configured to provide regulated power to the electric machine coupled to the output terminal of the power converter.

Further, at step 1004, a system controller (for example, system controller 108) is configured to generate a plurality of activation commands for the semiconductor switches and the switching modules 234. The system controller is configured to activate semiconductor switches such that the power converter operates in any of the modes "a", "b", or "c". The switching modules 234 that include energy storage devices, for example the capacitive element 236, are configured to stored energy in the energy storage devices 236 in modes "a", "b", and "c". The switching requirements for modes "a", "b", and "c" have been explained in conjunction with FIG. 6-8.

At 1004, the system controller 108 is also configured to generate activation commands such that the power converter is transitioned to mode "d" of operation. In mode "d", all legs of the power converter are coupled to the third bus 228. The power converter, in this mode, is configured to utilize energy stored in the energy storage devices 236.

At step 1006, when the electric machine is switched on for operation, the system controller 108 is configured to provide activation signals to the semiconductor switches and the switching modules in the form of gate trigger signals. The activation signals change the mode of operation of the power converter from either mode "a", or "b", or "c" to mode "d". Switching requirements for mode "d" have been explained in conjunction with FIG. 9.

When the power converter is operating in mode "d", the energy stored in the energy storage devices 236 of the power converter is utilized and provided to the electric machine coupled to the output terminal (for example, via the fourth bus 324). The energy provided from the energy storage devices 236 provides the electric machine with substantially high torque at substantially low speeds of operation. When the energy from the energy storage devices is exhausted, the controller 108 is configured to transition the power converter from mode "d" to either mode "a", or "b", or "c". The transition from mode "d" is also dependent on the input energy received by the power converter.

The system controller is also configured to determine if the energy stored in the energy storage devices 236 is below a predetermined threshold value. The controller compares energy stored in each of the energy storage devices 236 with the predetermined threshold value. When the energy stored is less than the predetermined threshold value, the method includes providing activation commands to the plurality of semiconductor switches ($S_1$-$S_4$) such that the power converter operates in either mode "a", or "b", or "c". The energy storage devices 236 are provided energy in these modes and are available for utilization by the electric machine when the machine is subsequently switched on for operation.

Figure 11:
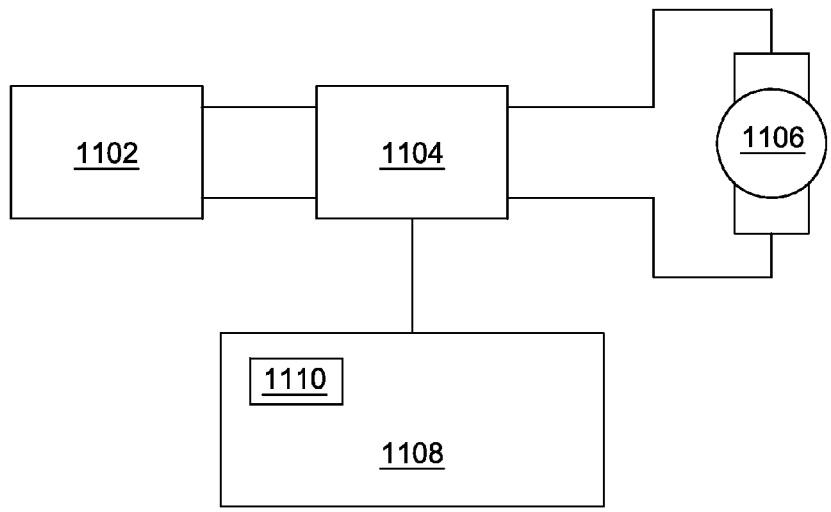
FIG. 11 is a diagrammatical representation of a system for driving an electric machine, according to aspects of the present disclosure.

FIG. 11 depicts a system 1100 for driving an electric machine 1106. In one embodiment, the system 1100 for driving the electric machine 1106 may include a source 1102, a power converter 1104, and a system controller 1108.

The source 1102 is coupled to an input terminal of the power converter 1104. The source 1102 is configured to provide power to the electric machine 1106 coupled to the output terminal of the power converter 1104. The power converter 1104 is configured to convert or regulate input provided by the source 1102 according to the requirements of the electric machine 1106. In certain embodiments, the source 1102 may be placed at a remote location with respect to the electric machine 1106. In such embodiments, the energy from the source 1102 is provided to the power converter 1104 through buses that couple the source 1102 and the power converter 1104. Similarly, the power converter 1104 and the electric machine 1106 may also be coupled through link buses.

The power converter 1104 includes at least one leg. An example of a leg is illustrated in FIG. 2. The leg 200 includes a first string 202, and a second string 204. The first string includes semiconductor switches ($S_1$-$S_4$), whereas the second string includes switching modules 234. The first string 202 is coupled to the first bus 206 and the second bus 208. The second string 204, on the other hand, is coupled to the first string 202 via the first connecting node 210 and second connecting node 212. In a three phase configuration of the power converter 1104, three legs 200 are coupled in parallel between the first bus 206 and the second bus 208. The electric machine 1106 is coupled to the second string 204 of each leg 200. The first string 202 of each leg is coupled to the third bus 228.

The system controller 1108, coupled to the plurality of semiconductor switches and the switching modules 234, is configured to activate the semiconductor switches ($S_1$-$S_4$) such that the power converter 1104 operates in modes "a", or "b", or "c". When the electric machine 1106 is switched on for operation, the system controller 1108 is configured to transition the power converter 1104 from modes "a", or "b", or "c" to mode "d". In mode "d", the switching modules 234 are configured to provide stored energy to the electric machine 1106 coupled to the third bus 228.

The system controller 1108 includes a module "d" activation module 1110 that is configured to determine a current mode of operation of the power converter. Based on the current mode of operation of the power converter, the mode "d" activation module determines the semiconductor switches ($S_1$-$S_4$) that need to be activated and deactivated to transition the mode of operation of the power converter to mode "d".

The system controller 1108 is also configured to balance energy stored in the switching modules 234 of every leg. The system controller 1108 computes energy stored in each switching module 234 of each leg 200. Based on a difference between energy stored in each switching module 234, the system controller 1108 drives a current through the leg 200 such that the difference between energy stored in the switching modules 234 is reduced to zero.

The system for driving an electric machine can include additional filters, and switching device bridges to meet harmonic requirements of the source 1102 and the electric machine 1106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system for driving electric machines, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A system for driving an electric machine, the system comprising:
 a power converter coupled to an input source and the electric machine, the power converter comprising:
 at least one power converter leg, each leg comprising:
 a first string comprising a plurality of controllable semiconductor switches, a first connecting node, and a second connecting node, wherein the first string is operatively coupled to the input source across a first DC bus and a second DC bus, wherein at least one of the controllable semiconductor switches is situated between the first connecting node and the first DC bus, and wherein at least one other of the controllable semiconductor switches is situated between the second connecting node and the second DC bus; and
 a second string operatively coupled to the first string via the first connecting node and the second connecting node, wherein the second string comprises a plurality of switching modules, wherein each of the plurality of switching modules comprises a plurality of fully controllable semiconductor switches and at least one energy storage device coupled in series across the plurality of fully controllable semiconductor switches, wherein the second string is operably coupled to the electric machine; and
 a system controller configured to provide activation commands to at least some of the controllable semiconductor switches from the first string, and at least some of the switching modules from the second string such that energy stored in at least one of the at least one energy storage devices of the plurality of switching modules is provided to the electric machine when the electric machine is switched on for operation.

2. The system as recited in claim 1, wherein the first string comprises a first branch and a second branch that are operatively coupled via a third connecting node.

3. The system as recited in claim 2, wherein the third connecting nodes of each of the legs are connected to a third DC bus.

4. The system as recited in claim 3, wherein the system controller is configured to provide activation commands such that at least one leg of the power converter is coupled to the first DC bus and at least one leg of the power converter is coupled to the second DC bus when the energy in the energy storage device is below a predetermined threshold value.

5. The system as recited in claim 4, wherein the system controller is configured to provide activation commands such that each leg of the power converter is coupled to the third DC bus when the electric machine is activated.

6. The system as recited in claim 1, wherein each of the switching modules comprise a half-bridge configuration.

7. The system as recited in claim 1, wherein the second string comprises a first arm operatively coupled to a second arm.

8. The system as recited in claim 7, wherein the system controller is configured to balance energy stored in the first arm and the second arm.

9. The system as recited in claim 1 wherein the electric machine comprises an electric motor.

* * * * *